United States Patent Office 3,536,497
Patented Oct. 27, 1970

3,536,497
METHOD FOR RETARDING STALING OF BAKED GOODS
Simon S. Jackel, Westport, Conn., assignor to Wyandotte Chemicals Corporation, Wyandotte, Mich., a corporation of Michigan
No Drawing. Filed Dec. 21, 1967, Ser. No. 692,327
Int. Cl. A21d 2/14, 15/00
U.S. Cl. 99—91      3 Claims

ABSTRACT OF THE DISCLOSURE

The method of decreasing rate of staling of yeast-raised bakery products which comprises mixing with the ingredients of said bakery products a mixture of conjugated polyoxyalkylene compounds corresponding to the formula:

$$HO(C_2H_4O)_a(C_3H_6O)_b(C_2H_4O)_cH$$

wherein $b$ is an integer sufficiently high to provide a molecular weight of at least about 900 for the oxypropylene base and wherein $a+c$ is an integer sufficiently high to provide 5 to 90% of the total molecular weight of the compound.

---

The housewife, as has been established by marketing research, commonly selects bread on the basis of softness. A hard or firm feeling loaf of bread she adjudges stale even though it may be less than twelve hours from the oven. As a consequence of this tendency most commercial bakers do everything possible to make their products soft.

Stale bread is sometimes sold at a discount but even this does not use up a store's supply and much of it is returned to the baker to be used up as bread crumbs or sold as animal food. Such practices are wasteful and expensive and the baker is always concerned with better ways of solving the "stale-return" problem.

Soft bread is commonly produced by keeping baking time to a minimum, by adjusting the formula used and by mixing, fermenting and handling the dough in such a way that the gas formed by the yeast is held in small cells having very thin cell walls. Mineral dough conditioners, malt syrup and invert syrup are ingredients often used for imparting softness.

Staleness in bread is accomplished by a number of changes. Thus, the loaf becomes progressively firmer, the crumb feels firmer, drier and more friable, and the flavor gradually changes. Rate of staling can be measured most satisfactorily by recording the increase in firmness of the crumb by some mechanical means, but methods measuring the decrease in ability of the crumb to absorb water and the decrease in its soluble starch content have also been used.

The actual mechanism of bread staling has been studied for nearly one hundred years and is still not definitely known. It was early proved, however, that staleness is independent of moisture content, for bread aged in completely moisture-proof containers would still go stale.

In the making of bread, rolls, and other yeast-raised bakery products, an important factor in producing a good product at a reasonable price is to employ a dough which has favorable dough handling properties. These dough properties include tolerance of the dough to overmixing and undermixing and dough strength which may be expressed in terms of stronger cell walls and greater resistance of the gluten to rupturing.

In addition to the above properties, it is also desirable that the final baked product have a bright white color in the crumb (inside the bread), a silky, velvety feel or texture on the inside, that it have close uniform cellular structure with very thin and fine cell walls. Accordingly, it is a purpose of this invention to provide for improved yeast-raised bakery products characterized by excellent dough properties, crumb color, texture, and cell structure wherein the useful life, i.e., softness retention is extended.

The present invention is based on the discovery that bread and similar yeast-raised bakery products can be made significantly softer and the rate of staling considerably decreased by mixing with the ingredients for the bakery products polyoxyalkylene nonionic surface agents of the type disclosed in U.S. Pat. No. 2,674,619 and Canadian Pat. No. 540,357.

Particularly desirable among the compounds of the class disclosed in U.S. Pat. No. 2,674,619 and Canadian Pat. No. 540,357 are the water-soluble conjugated polyoxypropylene-polyoxyethylene compounds containing in their structure oxypropylene groups, oxyethylene groups, and a nucleus of propylene glycol. These compounds are prepared by condensing ethylene oxide with a hydrophobic polyoxypropylene glycol base formed by the condensation of propylene oxide with propylene glycol. The average molecular weight of the polyoxypropylene polymer must be at least about 900. The disclosures of these two patents include such compounds where the oxyethylene groups constitute 5 to 90% of the total molecular weight of the compound.

When ethylene oxide is condensed with a hydrophobic polyoxyproplene glycol base as described above, a mixture of closely related homologues is produced and, accordingly, this product is referred to in the claims as ". . . a mixture of conjugated polyoxyalkylene compounds . . .".

The increasing addition or condensation of ethylene oxide on a given water-insoluble polyoxypropylene glycol base tends to increase its water-solubility and raise the melting point such that the products may be water-soluble, and normally liquid, pasty or solid in physical form. These polyoxyethylene condensates with polyoxypropylene glycol may be designated by the following structure:

$$HO(C_2H_4O)_a(C_3H_6O)_b(C_2H_4O)_cH$$

wherein $b$ is an integer sufficiently high to provide a molecular weight of at least about 900 for the oxypropylene base and wherein $a+c$ is an integer sufficiently high to provide 5 to 90% of the total molecular weight of the compound.

Compounds of this type are sold commercially by the Wyandotte Chemicals Corporation under the trademark Pluronic and are described in the brochure entitled The Pluronic Grid, Fifth Edition, published by the Wyandotte Chemicals Corporation, Wyandotte, Mich. The following are examples of compounds corresponding to the above formula as disclosed in the brochure.

TABLE I

| Name | Mol. wt. polyoxypropylene base | Ethylene oxide content in final product, wt. percent | Calculated mol. wt. of final product |
|---|---|---|---|
| Pluronic P65 | 1,750 | 50 | 3,500 |
| Pluronic F68 | 1,750 | 80 | 8,750 |
| Pluronic P85 | 2,250 | 50 | 4,500 |
| Pluronic P105 | 3,250 | 50 | 6,500 |
| Pluronic F108 | 3,250 | 80 | 16,250 |

The polyoxyethylene-polyoxypropylene compound may be added to the mix in any suitable manner. For example, it may be thoroughly mixed with the flour prior to the preparation of the dough, mixed with the shortening used prior to its addition to the mix, added with the salt, added directly to the dough, mixed during the mixing operation, or suspended in the water or milk used in preparing the dough. Except for the incorporation of the polyoxyalkylene compound, the normal operations employed in breadmaking or making similar baked goods are followed without any variations from those required when this product is not used.

The resulting baked product will retain its freshness for from one to three days longer than the untreated product. Since one-day old bread is considered technically by the baker to be stale, the surprising and unexpected advantages derived from the use of the above polyoxyalkylene compounds can be well appreciated by the baker, the housewife, and the consumer. The polyoxyalkylene compounds may be added to the mix for yeast-raised products of any type whether for preparation of white bread, coffee cake, sweet rolls, buns, doughnuts, etc.

A small quantity only of the polyoxyalkylene compound is required to make the bread softer and retard its rate of staling. Thus, amounts ranging from 0.20 to 1% on the weight of the flour in the formula have been found to yield particularly good results. Amounts ranging from about 0.1% to about 5.0% are useful.

The following examples are presented to particularly illustrate the invention.

EXAMPLE I

This example illustrates the manufacture of a white pan bread by a laboratory version of the well-known "Do-Maker" system. This system is described in many places in the literature such as the book, Breadmaking, Its Principles and Practice, Fourth Edition by Edmund B. Bennion, pp. 214–216, Oxford University Press, 1967. This process is begun with the production of a yeast brew or broth from the following components:

|  | Weight percent based on weight of flour | Weight in grams |
| --- | --- | --- |
| Water | 68.0 | 3,536.0 |
| Sugar | 8.0 | 416.0 |
| Salt | 2.25 | 117.0 |
| Milk solids | 3.00 | 156.0 |
| Yeast food | 0.5 | 26.0 |
| Calcium acid phosphate | 0.1 | 5.2 |
| Calcium propionate | 0.1 | 5.2 |
| Yeast | 2.5 | 130.0 |

The above ingredients were fermented for 2½ hours at 86° F.

The second step of the process is the "Dough or Premix" stage wherein the following components were mixed to incorporate them uniformly for 45 seconds at low speeds (20 r.p.m.) and 15 seconds at medium speed (100 r.p.m.).

|  | Weight percent based on weight of flour | Weight in grams |  |
| --- | --- | --- | --- |
| Flour | 100.0 | 5,200.0 |  |
| Broth | (1) | |  |
| Lard | 2.64 | 137.28 | These ingredients are melted and blended before use. |
| Cotton seed flakes | 0.14 | 7.28 |  |
| Emulsifier | 0.22 | 11.44 |  |
| Pluronic P65 polyol | 0.25 | 13.00 |  |
| Oxidation solution: |  |  |  |
| P.p.m. of KIO³ | 12.5 |  |  |
| P.p.m. of KBrO³ | 50.0 |  |  |

¹ As above.

The above premix dough was then transferred into the loading cylinder of a laboratory developer, wherein the hydraulically operated piston forces the mixture from the loading cylinder into the developer bowl at a constant rate. The developer unit is an oval-shaped bowl in which two counter-rotating impellers are located which subject the dough to a continuous stretching and folding as it passes under pressure to the extrusion point. The development takes place during passage of the mixture through the developer bowl and the developed dough was extruded under pressure as a ribbon which was manually divided.

The dough was proofed for about 60 minutes in a proofing cabinet maintained at 110° F. with a nearly water-saturated atmosphere, and then baked for 18 minutes at 425° F. The finished loaves had good volume, a very silky texture, and a very white crumb color. Staling was measured by the compressibility of the bread crumb which decreases with staling. A Baker Compressimeter was employed for making compressimeter readings which are the force in grams required to depress a plate 1.25" square, a distance of 2 millimeters, into a uniform slice 0.5" in thickness. The reading obtained after 72 hours was 13.5.

EXAMPLE II

The above process was repeated for the production of bread from four different formulations which were substantially identical with that of Example I with the exception that 0.22% of Pluronic polyol was used in each formulation rather than 0.25%. In one case the Pluronic polyol employed was Pluronic F108, in another it was Pluronic P105, in a third it was Pluronic F68, and in the fourth it was Pluronic P85. Bread made from all four formulations had excellent volume, improved texture characterized by a silky feel in the cut section, a very white crumb color, good side-wall strength and good softness retention after 72 hours.

EXAMPLE III

This example illustrates the manufacture of 2 batches of white pan bread by the conventional sponge and dough process using the following formula:

|  | Weight percent based on weight of flour | Weight in grams | |
| --- | --- | --- | --- |
| Sponge: |  |  | |
| Flour | 62.5 | 400.0 | |
| Water | 46.0 | 295.0 | |
| Yeast food | 0.5 | 3.2 | |
| Yeast | 2.5 | 16.0 | |
| Total |  | 714.2 | |
| Dough: |  |  | |
| Flour | 37.5 | 240.0 | |
| Water | 22.0 | 140.0 | |
| Sugar (Sucrose) | 7.0 | 45.0 | |
| Lard | 3.0 | 19.0 | |
| N.F.D. milk | 2.0 | 13.0 | |
| Salt | 2.0 | 13.0 | |
| Emulsifier | 0.2 | 1.3 | |
| Mold inhibitor | 0.1 | 0.6 | |
| Pluronic P65 polyol | 0.1 and 0.25 | 0.6 and | 1.6 |
| Total dough ingredients |  | 472.5— | 473.5 |
| Fermented sponge |  | 707.1— | 707.1 |
|  |  | 1,179.6— | 1,180.6 |

The sponge was mixed 10 seconds at low speed (20 r.p.m.), 20 seconds at intermediate speed (100 r.pm.), and 3 minutes at high speed (235 r.p.m.) on a dough-mixing machine. The fermentation time was about 4 hours in a fermentation cabinet at 82° F. dry bulb and 79° F. wet bulb. The remaining ingredients, that is to say, those listed under "Dough" above, were then added and the sponge and dough mixed the same as for mixing the sponge except that mixing at the third speed was about 4 minutes.

Next, the dough was placed in a bowl and put in the fermentation cabinet for 24 minutes. Two dough pieces at 430 grams each were scaled off and each sheeted through rollers at ¼" and again at ⁷⁄₃₂". Each piece was folded in thirds, placed in a baking pan, and returned to fermentation cabinet for 16 minutes. Each dough piece was then sheeted again at ⁷⁄₃₂", folded in half and cross graining sheeted again at ⁷⁄₃₂." Each dough piece was curled, the bottom sealed, and then placed in the proof box at 95° F. dry bulb and 94° F. wet bulb for primary proofing (time: 50–60 minutes), and baked for 18 minutes at 425° F.

The finished loaves from each batch had excellent volume, improved texture, a cut section had a silky feel, and had good side-wall strength. Each loaf retained softness after 72 hours.

EXAMPLE IV

This example illustrates the manufacture of a white pan bread by the conventional sponge and dough process using the following formula:

| | Weight percent based on weight of flour | | |
|---|---|---|---|
| | Sponge | Dough | Total |
| Flour | 65.00 | 35.00 | 100.00 |
| Water | 38.00 | 23.00 | 61.00 |
| Dextrose | | 10.00 | 10.00 |
| Enzyme (MLO) | 0.37 | 3.00 | 3.37 |
| Shortening | 1.50 | 1.50 | 3.00 |
| Yeast | 2.75 | | 2.75 |
| Salt | | 2.25 | 2.25 |
| Pluronic F108 polyol | | 0.75 | 0.75 |
| Yeast food | 0.50 | | 0.50 |
| Oxidation (Paniplus) | | 0.25 | 0.25 |
| Calcium acid phosphate | 0.01 | | 0.01 |
| Calcium propionate | | 0.01 | 0.01 |

The sponge was mixed 1 minute at low speed (20 r.p.m.) and 5 minutes at high speed (235 r.p.m.) on a dough-mixing machine. The fermentation time was 4 hours and 15 minutes at 78° F. The remaining ingredients, that is to say, those listed under "Dough" above, were then added and the sponge and dough mixed 4½ minutes (at 235 r.p.m.), followed by fermentation at ambient conditions for 22 minutes. Proof time after molding was 50 minutes at 102° F. The bread was then baked 21 minutes at 390° F. The finished loaves had excellent crumb color, improved cellular structure, a cut section had a silky, velvety feel, and the loaves had good side-wall strength. Staling was measured by the compressibility of the bread crumb which decreases with staling. The Baker Compressimeter reading obtained after 72 hours was 9.4.

EXAMPLE V

This example illustrates the manufacture of a white pan bread by the conventional sponge and dough process using the following formula:

| | Weight percent based on weight of flour | | |
|---|---|---|---|
| | Sponge | Dough | Total |
| Flour | 59.5 | 40.5 | 100.00 |
| Water | 34.5 | 25.75 | 60.25 |
| Liquid dextrose (70% solids) | | 11.75 | 11.75 |
| Non-fat dry milk | | 3.0 | 3.0 |
| Yeast | 2.5 | | 2.5 |
| Shortening | 2.0 | | 2.0 |
| Salt | | 2.0 | 2.0 |
| Enzyme (Protase) | 0.75 | | 0.75 |
| Yeast food (Arkady) | 0.75 | | 0.75 |
| Pluronic F108 polyol | 0.50 | | 0.50 |
| Enzyme (Wytase 52) | | 0.3 | 0.3 |

The sponge was mixed 1 minute at low speed (20 r.p.m.) and 5 minutes at high speed (235 r.p.m.) on a dough-mixing machine. The fermentation time was 4 hours at 76° F. The remaining ingredients, that is to say, those listed under "Dough" above, were then added and the sponge and dough mixed 1 minute at low speed (20 r.p.m.) and 12 minutes at high speed (235 r.p.m.), followed by fermentation for 27 minutes. Proof time after molding was 68 minutes at 110° F., and it was then baked 21 minutes at 390° F. The finished loaves had good volume, improved cellular structure, a cut section had a silky, velvety feel, and the loaves had good side-wall strength. Staling was measured by the compressibility of the bread crumb which decreases with staling. The Baker Compressimeter reading obtained after 72 hours was 8.8.

It is to be understood that various changes and modifications may be made in the foregoing without departing from the spirit of the invention and the scope of the appended claims.

What is claimed is:

1. In the preparation of yeast-raised bakery products, the method of decreasing rate of staling which comprises mixing with the ingredients of said bakery products in an amount sufficient to retard said staling rate a mixture of conjugated polyoxyalkylene compounds corresponding to the formula:

$$HO(C_2H_4O)_a(C_3H_6O)_b(C_2H_4O)_cH$$

wherein $b$ is an integer sufficiently high to provide a molecular weight of at least about 900 for the oxypropylene base and wherein $a+c$ is an integer sufficiently high to provide 5 to 90% of the total molecular weight of the compound.

2. The method of claim 1 wherein said mixture of polyoxyalkylene compounds is employed in an amount of from about 0.1 to 5.0% by weight of the total flour in the mix prior to baking.

3. The method of claim 2 wherein $b$ is an integer having a value to provide a molecular weight of about 1,500 to 3,500 for the oxypropylene base and $a+c$ is an integer having a value to provide 40 to 90% of the total molecular weight of the compound.

References Cited

UNITED STATES PATENTS 2,674,619  4/1954  Lundsted _____ 260—485

LIONEL M. SHAPIRO, Primary Examiner

J. R. HOFFMAN, Assistant Examiner

U.S. Cl. X.R.

99—86, 92